United States Patent [19]
Fielding et al.

[11] Patent Number: 5,206,049
[45] Date of Patent: Apr. 27, 1993

[54] CHOLINE-CONTAINING COMPOSITIONS AS SALT SUBSTITUTES AND ENHANCERS AND A METHOD OF PREPARATION

[75] Inventors: Stuart Fielding, Morris Plains, N.J.; Kenneth W. Locke, Charlestown, Mass.; Alvin Kershman, St. Louis, Mo.

[73] Assignee: Interneuron Pharmaceuticals, Inc., Lexington, Mass.

[21] Appl. No.: 834,883

[22] Filed: Feb. 11, 1992

Related U.S. Application Data

[63] Continuation-in-part of Ser. No. 654,448, Feb. 12, 1991.

[51] Int. Cl.5 .................... A23L 1/227; A23L 1/237
[52] U.S. Cl. .................................. 426/649; 426/99; 426/650
[58] Field of Search .................. 426/649, 650, 99

[56] References Cited

U.S. PATENT DOCUMENTS

| | | | |
|---|---|---|---|
| 2,601,112 | 6/1952 | Freedman | 426/649 |
| 3,949,094 | 4/1976 | Johnson et al. | 426/99 |
| 4,385,076 | 5/1983 | Crosby | 426/649 |
| 4,486,456 | 12/1984 | Thompson | 426/649 |
| 4,556,566 | 12/1985 | Bell | 426/649 |
| 4,556,568 | 12/1985 | Meyer | 426/649 |
| 4,560,574 | 12/1985 | Meyer | 426/649 |

Primary Examiner—Jeanette Hunter
Assistant Examiner—Mary S. Mims
Attorney, Agent, or Firm—Pennie & Edmonds

[57] ABSTRACT

Novel compositions comprising mixtures of sodium chloride and choline-containing compounds which are effective as salt substitutes or enhancers are disclosed along with a method for imparting saltiness to, or enhancing the saltiness of, edible materials by the addition of these novel compositions. A method for enhancing the saltiness of edible materials by the addition of choline-containing compounds is also disclosed. Further, a process of producing the novel compositions in the form of free-flowing granules of good shelf-life and acceptable saltiness is disclosed.

16 Claims, No Drawings

CHOLINE-CONTAINING COMPOSITIONS AS SALT SUBSTITUTES AND ENHANCERS AND A METHOD OF PREPARATION

This application is a continuation-in-part of application Ser. No. 07/654,448, filed Feb. 12, 1991.

1. INTRODUCTION

The present invention is generally directed to the use of choline-containing compounds as salt or sodium chloride (NaCl) substitutes and enhancers. The invention covers novel compositions comprising mixtures of sodium chloride and choline-containing compounds which are effective as salt substitutes. Yet another embodiment of the invention is directed to a method of imparting saltiness to, or enhancing the saltiness of, edible materials by the addition of such novel mixtures of sodium chloride and choline-containing compounds. The invention further covers a method of enhancing the saltiness of edible materials by the addition of choline-containing compounds.

2. BACKGROUND OF THE INVENTION

An in-born appetite for salt, more specifically sodium chloride or NaCl, is found in many mammals, including humans. Historically, salt was considered a valuable commodity to human populations living far from the sea. Soldiers in the army of ancient Rome received an allowance of salt called a salarium. Later on, the allowance was changed to money to buy salt; hence, the word "salary" and the expression "not worth his salt."

The importance attached to salt or, more accurately, sodium, is not without a biological basis. Sodium accounts for approximately 90% of the extracellular cations in humans, thereby making it the most important factor in determining the volume and concentration of blood and extracellular fluid. In this way, sodium also affects blood pressure. Many studies, including Intersalt, a survey of over 10,000 people in 32 countries, have linked high salt ingestion with high blood pressure. The average American consumes nine grams of sodium per day; the average Japanese, fourteen. Concern over high blood pressure, or hypertension, and its cardiovascular consequences, thus has prompted many people to limit their intake of salt and other sodium-containing products.

However, the "perfect" salt substitute has eluded many researchers, mostly because of the specificity of the mechanism for salt taste perception. (Erickson D. "Trick of the Tongue: A unique mechanism of taste means no substitute for salt." *Scientific American,* pages 80–81, May 1990). According to current theory, the taste of salt begins when sodium ions pass through specialized pores, or sodium ion channels, in taste bud cell membranes. The influx of sodium ions causes the taste bud cells to depolarize, triggering the release of neurotransmitters which excite the nerves carrying the salt message to the brain. (Heck GL et al. "Salt Taste Transduction Occurs Through an Amiloride-Sensitive Sodium Transport Pathway." *Science* 223: 403–4 (1984)).

So far, only sodium and lithium have been shown to pass through this channel, thus limiting the possibilities for "true" salt alternatives. Though potassium does not pass through the sodium ion channels, it has been used, in the form of potassium chloride (Kcl), in the "lite salt" mixtures currently sold. However, the utilization of potassium chloride as a salt substitute is limited by the bitter aftertaste imparted by the compound.

Others have looked to so-called "salty" peptides as alternatives to salt, particularly derivatives of ornithyl-taurine and ornithyl-$\beta$-alanine. (Tamura M. et al. "An Enhancing Effect on the Saltiness of Sodium Chloride of Added Amino Acids and Their Esters." *Agric. Biol. Chem.* 53(6):1625–1633 (1989); Seki T et al. "Further Study on the Salty Peptide Ornithyl-$\beta$-alanine. Some Effects of Ph and Additive Ions on the Saltiness." *J. Agric. Food Chem.* 38: 25–29 (1990)). However, these compounds are not salty in the absence of Hcl. Moreover, their cost and difficulty of synthesis are expected to limit their utility as salt substitutes. (Worthy W. "New sweet, salty peptides synthesized." *Chemical & Engineering News,* pages 25–26 (Jan. 8, 1990)).

Knowledge of the mechanism of salt taste perception, coupled with the finding that lithium chloride is poisonous, has led some to search for salt enhancers, that is, substances which boost the "saltiness" of sodium-containing compounds, thereby permitting the use of lower levels of sodium chloride. However, until now, researchers likewise have been stymied in their quest for salt enhancers, with one chemosensory physiologist in Virginia recently reporting that he had spent 18 months screening food compounds without uncovering any good candidates. (Erickson D. "Trick of the Tongue: A unique mechanism of taste means no substitute for salt." *Scientific American,* pages 80–81, May 1990).

3. SUMMARY OF THE INVENTION

The present invention is generally directed to the use of choline-containing compounds, particularly choline chloride, as salt or sodium chloride (NaCl) substitutes and enhancers. The invention covers compositions which are effective as salt substitutes which comprise novel mixtures of sodium chloride and choline-containing compounds, particularly in ratios of about 5:1 to 1:10. Yet another embodiment of the invention is directed to a method of imparting saltiness to, or enhancing the saltiness of, edible materials by the administration or use of such novel compositions. The invention further covers a method of enhancing the saltiness of edible materials by the addition of choline-containing compounds. Yet another embodiment of the invention is directed to a method of producing a granular form of the novel composition comprising mixtures of sodium chloride and choline-containing compounds. Yet another embodiment of the invention is directed to the granular form of the novel composition which has acceptable shelf-life and is capable of imparting saltiness without an off taste. The choline-containing compounds of the present invention may include choline or structural analogs of choline in combination with various anions.

4. DETAILED DESCRIPTION OF THE INVENTION

The present invention is generally directed to the use of choline-containing compounds, particularly choline chloride, as salt or sodium chloride (NaCl) substitutes and enhancers. The invention covers compositions which are effective as salt substitutes which comprise novel mixtures of sodium chloride and choline-containing compounds, particularly in ratios of about 5:1 to 1:10. Yet another embodiment of the invention is directed to a method of imparting saltiness to, or enhancing the saltiness of, edible materials by the administration or use of such novel compositions in lieu of the higher levels of sodium chloride that would be required if sodium chloride were being used alone. The invention further covers a method of enhancing the saltiness of edible materials by the addition of choline-containing compounds, particularly such that the final ratio of sodium chloride to choline chloride is from about 5:1 to 1:10.

The term choline-containing compounds, as used herein, includes choline or structural analogs of choline in combination with various anions. These anions may include, among others, any of the halides (fluoride, iodide, chloride and bromide), bitartrate, dihydrogen citrate, dihydrocholate, and salicylate, or a mixture thereof. In a preferred embodiment, the choline-containing compound is choline chloride.

The compositions of the present invention include an effective amount of sodium chloride in combination with a choline-containing compound or a mixture of choline-containing compounds. An effective amount of sodium chloride is that amount of sodium chloride which is above the threshold for detection by humans and, therefore, capable of enhancement by the addition of choline-containing compounds. As the perception of saltiness is somewhat subjective, this threshold necessarily varies from person to person and with the nature and form of the material to be consumed, i.e. liquid, solid, raw, baked or cooked etc. For example, in one embodiment of the invention, tomato soup, the threshold appears to be about 0.04% to 0.05%.

In the compositions of the present invention, the ratio of sodium chloride to the choline-containing compound or mixture of choline-containing compounds may vary from between about 5:1 and 1:10, with a preferred ratio being between about 2:1 and 1:10. Ratios of between about 1:1 and 1:3 and between about 1:1 and 1:2 are particularly preferred. The choice of a particular ratio will necessarily depend on several factors, including the effective amount of sodium chloride in the compositions and the nature of the product or the manner in which the composition is used.

Edible materials to which the compositions of the present invention can be added include anything in which salt is normally found or used such as, for example, fruits, vegetables, juices, soups, meat products, egg products, fruit concentrates, salad dressings, milk products, grain products such as breads and other baked goods, cheese products, beverages and confections.

The compositions of the present invention may also be used, according to the methods of the present invention, to impart saltiness to, or enhance the saltiness of, a wide variety of edible materials. When used in such a manner, the compositions of the present invention may be added, for example, in the form of solutions, powders, granules, emulsions etc., during the preparation of the edible materials. The compositions of the present invention may also be used, in granular or crystalline form, to "salt" foods that have already been prepared, such as pretzels and french fries, or to "salt" foods to be cooked, such as meats and vegetables. As all choline salts are hygroscopic, an inert agent that absorbs water, such as calcium carbonate, silica or dibasic or tribasic calcium phosphate, should be added, in sufficient quantity, to maintain a free-flowing granular mixture.

The shelf-life of the compositions of the present invention, when in the granular or crystalline form, can be significantly increased by partially coating the granules comprising sodium chloride and a choline-containing compound with a hydrophobic material. The coating prevents the absorption of water upon storage by the hygroscopic choline-containing compound. The coating also allows for the controlled dissolution of sodium chloride and choline-containing compound from the granules, so as to optimize the ability of the choline-containing compound to enhance the saltiness of the sodium chloride. Such controlled dissolution eliminates the negative off taste that would result from the preferential release of choline-containing compound independent of the dissolution of sodium chloride, or the reduced enhancement of saltiness from the preferential release of sodium chloride independent of the dissolution of the choline-containing compound. The coating typically comprises a hydrophobic material such as lecithin, hydrogenated vegetable oil, and mixtures thereof.

The choline-containing compounds may also be used, by themselves, according to the methods of the present invention, to enhance the saltiness of edible materials which already contain sodium chloride, such as commercially available low sodium products. When used in this manner, the choline-containing compounds may be added in the form of solutions, powders, granules, emulsions, etc.

4.1 THE RAT MODEL FOR SCREENING

Choline chloride's effectiveness as a salt enhancer was first demonstrated in rats treated with deoxycorticosterone acetate (DOCA). DOCA has long been known to increase a rat's natural appetite for salt. (Rice KK and Richter CP. "Increased Sodium Chloride And Water Intake Of Normal Rats Treated With Desoxycorticosterone Acetate." *Endocrinology* 33: 106–115 (1943)).

The potentiation of NaCl intake by choline chloride was studied by evaluating solutions with varying ratios of NaCl and choline chloride, first fixing one component and then the other. The observation of increased consumption of solutions containing choline chloride and sodium chloride over solutions containing the same amount of sodium chloride alone, suggested the effectiveness of choline chloride and other choline-containing compounds as a salt enhancer. The effectiveness of choline chloride and other choline-containing compounds was then confirmed by human taste panel evaluations.

4.2 HUMAN TASTE PANEL EVALUATIONS

Several blind taste preference studies were conducted in humans to establish the effectiveness of choline chloride as a salt enhancer. As a general protocol, subjects were presented with two bowls of tomato soup, one of which had a particular level of sodium chloride, the other of which contained varying amounts of choline chloride in addition to this level of sodium chloride. Subjects were asked to evaluate each pair for saltiness. The levels of sodium chloride were varied, as well as the ratios of sodium chloride to choline chloride, as set forth below.

It is recognized that individual taste preferences for degrees of saltiness vary so substantially that it is difficult to delineate well defined limits for useable ranges of concentrations and ratios. Thus, the specific examples presented are not intended to establish limits for the scope of the invention, but are merely exemplifications; and, it is understood that, for any given edible material, the amount of choline chloride or choline-containing compounds needed to obtain the enhancement of the salty taste of sodium chloride may be determined by simple experimentation.

EXAMPLE 1

Panels of ten and thirteen subjects were asked to evaluate the saltiness of Campbell's low sodium tomato soup, which contains approximately 0.043% (127 mg) NaCl, and Campbell's low sodium tomato soup to which varying amounts of choline chloride had been added. The results set forth in Table 1 below appear to indicate that 0.043% NaCl is probably near the human threshold of detection for sodium chloride in this particular medium.

TABLE 1

| RATIO OF NaCl TO CHOLINE Cl [0.043% or 127 mg NaCl] | SUBJECTS SELECTING SOUPS WITH ADDED CHOLINE CHLORIDE OVER SOUPS CONTAINING NaCl ALONE |
| --- | --- |
| 5:1 | 6/10 |
| 4:1 | 5/10 |
| 3:1 | 5/10 [1][1] |
| 2:1 | 5/13 |
| 1:1 | 5/13 |
| 1:2 | 6/13 [1] |
| 1:3 | 5/13 [2] |
| 1:5 | 6/13 [1] |
| 1:7 | 7/13 |
| 1:10 | 9/13 |

[1]In each table, the number in brackets indicates the number of subjects who could not ascertain which of the paired soups was saltier.

EXAMPLE 2

Panels of ten and eleven subjects were asked to evaluate the saltiness of Campbell's low sodium tomato soup in which the NaCl level had been raised to approximately 298 mg of 0.1% by the addition of 171 mg NaCl, and this 0.1% soup to which varying amounts of choline chloride had been added. Results establishing the effectiveness of choline chloride as a salt enhancer are set forth in Table 2 below.

TABLE 2

| RATIO OF NaCl TO CHOLINE Cl [0.1% or 298 mg. NaCl] | SUBJECTS SELECTING SOUPS WITH ADDED CHOLINE CHLORIDE OVER SOUPS CONTAINING NaCl ALONE |
| --- | --- |
| 5:1 | 5/11 [1] |
| 4:1 | 4/11 [1] |
| 3:1 | 6/11 |
| 2:1 | 7/10 |
| 1:1 | 9/10 [1] |
| 1:2 | 7/10 |
| 1:3 | 7/10 [1] |
| 1:5 | 7/10 [1] |
| 1:7 | 7/10 |
| 1:10 | 6/10 |

EXAMPLE 3

A panel of ten subjects was asked to evaluate the saltiness of Campbell's low sodium tomato soup in which the NaCl level had been raised to approximately 596 mg or 0.2% by the addition of 469 mg NaCl, and this 0.2% soup to which varying amounts of choline chloride had been added. Results establishing the effectiveness of choline chloride as a salt enhancer are set forth in Table 3 below.

TABLE 3

| RATIO OF NaCl TO CHOLINE Cl [0.2% or 596 mg NaCl] | SUBJECTS SELECTING SOUPS WITH ADDED CHOLINE CHLORIDE OVER SOUPS CONTAINING NaCl ALONE |
| --- | --- |
| 5:1 | 7/10 |
| 4:1 | 5/10 |
| 3:1 | 4/10 |
| 2:1 | 6/10 |
| 1:1 | 10/10 |
| 1:2 | 8/10 |
| 1:3 | 8/10 |
| 1:5 | 9/10 |
| 1:7 | 9/10 |
| 1:10 | 10/10 |

EXAMPLE 4

A panel of eleven subjects was asked to evaluate the saltiness of Campbell's low sodium tomato soup in which the NaCl level had been raised to approximately 894 mg. or 0.3% by the addition of 767 mg NaCl, and this 0.3% soup to which varying amounts of choline chloride had been added. Results establishing the effectiveness of choline chloride as a salt enhancer are set forth in Table 4 below.

TABLE 4

| RATIO OF NaCl TO CHOLINE Cl [0.3% or 894 mg NaCl] | SUBJECTS SELECTING SOUPS WITH ADDED CHOLINE CHLORIDE OVER SOUPS CONTAINING NaCl ALONE |
| --- | --- |
| 5:1 | 8/11 |
| 4:1 | 5/11 |
| 3:1 | 5/11 [3] |
| 2:1 | 8/11 |
| 1:1 | 7/11 |
| 1:2 | 8/11 |
| 1:3 | 8/11 [1] |
| 1:5 | 7/11 |
| 1:7 | 8/11 |
| 1:10 | 10/11 |

EXAMPLE 5

A panel of eleven subjects was asked to evaluate the saltiness of Campbell's low sodium tomato soup in which the NaCl level had been raised to approximately 1.192 grams or 0.4% by the addition of 1.065 grams NaCl, and this 0.4% soup to which varying amounts of choline chloride had been added. Results establishing the effectiveness of choline chloride as a salt enhancer are set forth in Table 5 below.

TABLE 5

| RATIO OF NaCl TO CHOLINE Cl [0.4% or 1.192 g. NaCl] | SUBJECTS SELECTING SOUPS WITH ADDED CHOLINE CHLORIDE OVER SOUPS CONTAINING NaCl ALONE |
| --- | --- |
| 5:1 | 9/11 |
| 4:1 | 8/11 |
| 3:1 | 6/11 [1] |
| 2:1 | 10/11 [1] |
| 1:1 | 8/11 [1] |
| 1:2 | 9/11 |
| 1:3 | 9/11 |
| 1:5 | 11/11 |
| 1:7 | 9/11 |
| 1:10 | 9/11 |

4.3 GRANULAR MIXTURE OF SODIUM CHLORIDE AND CHOLINE CHLORIDE

One embodiment of the present invention is a salt substitute and salt enhancer in the form of free-flowing granules of good shelf-life and acceptable saltiness. The granules would comprise particles of sodium chloride and choline chloride aggregated together by a maltodextrin component. It is preferred that the maltodextrin be highly water-soluble and not hygroscopic. A major portion of the maltodextrin is preferably highly polymerized polysaccharides (i.e. tetrasaccharides and above).

The aggregate of sodium chloride, choline chloride and maltodextrin is at least partially to almost completely coated with a water-insoluble layer comprising hydrogenated vegetable oil and lecithin. It has been found that without the water-insoluble layer, the aggregate having the combination of choline chloride and sodium chloride would exhibit poor shelf stability and pourability in normal packaging material relative to table salt. It is, however, important to not completely coat the aggregate with the water-insoluble layer as this would prevent water from contacting the aggregate and thus prevent the dissolution and release of the sodium chloride and choline chloride when used on foods or when eaten.

Lecithin is used as a component of the water-insoluble layer to serve as a natural phospholipid hydrophobic emulsifier, which minimizes the amount of hydrogenated vegetable oil needed to form the layer and which will not impart a bitter taste to the granular mixture.

The granular mixture may be prepared from raw material ingredients having any suitable particle size. Preferably, the sodium chloride and choline chloride particles have particle sizes in the range of about 30 to about 100 mesh (U.S. sieve size). More preferably, the particle sizes are in the range of about 30 to 60 mesh. Most preferably, the particle sizes are in the range of about 40 to about 60 mesh.

The sodium chloride and choline chloride particles may be blended in the proportions previously discussed for the present invention. Preferably, weight ratios of sodium chloride to choline chloride are from 1:1 to 9:1, and most preferably from 1:1 to 5:1.

A pre-blended mixture of sodium chloride and choline chloride of proper particle size is placed into a planetary mixer bowl and heated to about 120°-130° F. Maltodextrin is then added to the hot mixture such that the final dry weight of the maltodextrin in the mixture is about 10% to about 75% of the weight of the sodium chloride.

The coating mixture of lecithin and hydrogenated vegetable oil preferably contains lecithin levels of about 15 to about 35% of the coating mixture. The melting point of the hydrogenated vegetable oil can vary from 100°-180° F. and can be composed of vegetable stearines derived from corn, soy, cotton seed or other non-lauric fat sources. The coating mixture can be treated with an appropriate anti-oxidant system depending on the proposed product shelf life. The coating mixture is preheated, prior to adding it to the mixture of sodium chloride and choline chloride, to about 10° F. above the melting point of the specific hydrogenated vegetable oil used.

While the choline chloride/sodium chloride maltodextrin mix is being agitated in the planetary mixer at low speed, the appropriate amount of preheated coating mixture is slowly poured onto the powder in a fine stream or streams of less than ⅛" in width (depending on the size of the batch).

The coating is added in this manner while agitating until a level of coating is reached ranging from about 10% to about 40% by weight of the finished batch.

The temperature of the mixing kettle is then reduced slowly to approximately 100° F. to ensure full solidification of the coating.

The granular mixture is then placed in bins for tempering (stabilization of the fat crystals) which takes approximately 24 hours at room temperature (70° F.). For larger batches, forced cooling to room temperature may be necessary to prevent residual heat from interfering with the tempering process.

Following tempering, materials are then screened to remove excess fines which can be reprocessed in a later batch.

This process can also be duplicated using a ribbon blender of other slowly agitating, blending device that allows for the addition of a stream of coating material and the moving of the coated mixture to the bottom of the batch so that new material can be coated, as is the case when using the planetary mixer.

A major key to this process relates to the solidification of the hydrogenated vegetable oil. As the oil contacts the particles, it goes from a liquid to a semisolid state and quickly begins to solidify, thus minimizing agglomeration. Excess agglomeration will cause excess particle size and an excess of nonusable material. The preferable range in particle size of the final product is about 30 to about 80 mesh.

Also, extreme temperatures in the kettle will cause excess filming, thus resulting in a product that will not properly release upon exposure to water when used on foods or when eaten.

What is claimed is:

1. A process for preparing a salt substitute and salt enhancer composition which comprises:
   a) blending an effective amount of sodium chloride and choline-containing compound to form a mixture;
   b) heating the mixture to about 120°-130° F.;
   c) adding maltodextrin to the hot mixture such that the final dry weight of the maltodextrin is about 10% to about 75% of the weight of the sodium chloride, so that a dry aggregate comprising sodium chloride, choline-containing compound, and maltodextrin is formed;
   d) adding a coating mixture comprising lecithin and hydrogenated vegetable oil onto the aggregate to at least partially but not completely cover the aggregate with a water-insoluble layer to form a coated granular mixture; and
   e) cooling the coated granular mixture, wherein the coating mixture is heated prior to being added to the aggregate to 10° F. above the melting point of the hydrogenated vegetable oil.

2. The process according to claim 1, wherein the choline-containing compound is selected from the group consisting of choline fluoride, choline chloride, choline bromide, choline iodide, choline bitartrate, choline dihydrogen citrate, choline dihydrocholate, choline salicylate, and a mixture thereof.

3. The process according to claim 2, wherein the choline-containing compound is choline chloride.

4. The process according to claim 1, 2 or 3, wherein the ratio of sodium chloride to the choline-containing compound is between 5:1 and 1:10.

5. The process according to claim 4, wherein the ratio of sodium chloride to the choline-containing compound is between 5:1 and 1:1.

6. The process according to claim 1, wherein the sodium chloride and choline-containing compound have particle sizes in the range of about 30 to about 80 mesh.

7. The process according to claim 1, wherein the hydrogenated vegetable oil comprises vegetable stearines derived from corn, soy, cotton seed or other non-lauric fat sources.

8. The process according to claim 1, wherein the coating mixture contains about 15% to about 35% of the coating mixture.

9. The process according to claim 1, wherein the coating mixture is from about 10% to about 40% by weight of the coated granular mixture.

10. The process according to claim 1, further comprising after d) the step of maintaining the temperature of the coated granular mixture at about 100° F. until the water-insoluble layer is solidified.

11. The process according to claim 1, further comprising after e) the step of tempering the coated granular mixture at room temperature until the fat crystals are stabilized.

12. A salt substitute and salt enhancer composition prepared by a process which comprises:
a) blending an effective amount of sodium chloride and choline-containing compound to form a mixture;
b) heating the mixture to about 120°-130° F.;
c) adding maltodextrin to the hot mixture such that the final dry weight of the maltodextrin is about 1% to about 50% of the weight of the sodium chloride, so that dry aggregate comprising sodium chloride, choline-containing compound, and maltodextrin is formed;
d) adding a coating mixture comprising lecithin and hydrogenated vegetable oil onto the aggregate to at least partially but not completely cover the aggregate with a water-insoluble layer to form a coated granular mixture; and
e) cooling the coated granular mixture, wherein the coating mixture is heated prior to being added to the aggregate to 10° F. above the melting point of the hydrogenated vegetable oil.

13. A salt substitute and salt enhancer composition which comprises coated particles, each particle comprising:
a) a core comprising an aggregate of sodium chloride, choline-containing compound, and maltodextrin and
b) a coating on the core, such coating at least partially but not completely covering the core and comprising lecithin and hydrogenated vegetable oil.

14. The composition according to claim 12 or 13, wherein the choline-containing compound is selected from the group consisting of choline fluoride, choline chloride, choline bromide, choline iodide, choline bitartrate, choline dihydrogen citrate, choline dihydrocholate, choline salicylate, and a mixture thereof.

15. The composition according to claim 12 or 13, wherein the choline-containing compound is choline chloride.

16. The composition according to claim 12, or 13, wherein the ratio of sodium chloride to the choline-containing compound is between 5:1 and 1:10.

* * * * *